US009449805B2

(12) United States Patent
Perelman

(10) Patent No.: US 9,449,805 B2
(45) Date of Patent: Sep. 20, 2016

(54) ISOLATION OF CHARGED PARTICLE OPTICS FROM VACUUM CHAMBER DEFORMATIONS

(71) Applicant: Agilent Technologies, Inc., Santa Clara, CA (US)

(72) Inventor: Gershon Perelman, Santa Clara, CA (US)

(73) Assignee: Agilent Technologies Inc., Santa Clara, CA (US)

( * ) Notice: Subject to any disclaimer, the term of this patent is extended or adjusted under 35 U.S.C. 154(b) by 0 days.

(21) Appl. No.: 14/493,589

(22) Filed: Sep. 23, 2014

(65) Prior Publication Data

US 2016/0086786 A1 Mar. 24, 2016

(51) Int. Cl.

*G03B 5/00* (2006.01)
*H01J 29/02* (2006.01)
*H01J 49/24* (2006.01)
*H01J 49/26* (2006.01)

(52) U.S. Cl.

CPC ................ *H01J 49/24* (2013.01); *H01J 49/26* (2013.01)

(58) Field of Classification Search

USPC .......... 250/492.1, 492.2, 492.3, 492.21, 309, 250/310, 396 R, 357, 583, 526

See application file for complete search history.

(56) References Cited

U.S. PATENT DOCUMENTS

| | | | | |
|---|---|---|---|---|
| 6,445,440 | B1 | 9/2002 | Bisschops et al. | |
| 6,674,510 | B1 * | 1/2004 | Jasper | G03F 9/70 355/53 |
| 6,774,374 | B1 * | 8/2004 | Driessen | F16C 29/025 250/492.2 |
| 6,882,405 | B2 * | 4/2005 | Jasper | G03F 9/70 355/53 |
| 7,259,373 | B2 * | 8/2007 | Zani | B82Y 10/00 204/192.11 |
| 7,375,361 | B2 * | 5/2008 | Turner | B25H 1/0092 250/559.29 |
| 7,480,051 | B2 * | 1/2009 | Frank | G01N 21/9501 356/399 |
| 7,495,244 | B2 * | 2/2009 | Zani | B82Y 10/00 204/192.11 |
| 7,495,245 | B2 * | 2/2009 | Zani | B82Y 10/00 204/192.11 |
| 2003/0178579 | A1 * | 9/2003 | Tanaka | F16C 23/04 250/491.1 |
| 2004/0046294 | A1 * | 3/2004 | Kubo | F16C 32/0603 267/136 |
| 2004/0080737 | A1 * | 4/2004 | Jasper | G03F 9/70 355/55 |
| 2004/0169832 | A1 * | 9/2004 | Shimoda | G03F 7/707 355/30 |
| 2004/0207847 | A1 * | 10/2004 | Hardy | G01B 21/24 356/399 |
| 2008/0204605 | A1 * | 8/2008 | Tsai | H04N 5/4403 348/734 |
| 2008/0204695 | A1 * | 8/2008 | Schwarzl | G03F 7/707 355/75 |
| 2011/0013744 | A1 | 1/2011 | Nicolosi et al. | |

OTHER PUBLICATIONS

Jiming Huang and Yangmin Li; Analysis of a Novel 2-DOF Flexure Hinge-based Parallel Micromanipulator in a Polar Coordinate System; Proceedings of the 2010 IEEE International Conference on Automation and Logistics, Aug. 16-20, 2010, Hong Kong and Macau.

(Continued)

*Primary Examiner* — Bernard E Souw

(57) ABSTRACT

A charged particle processing apparatus includes a vacuum chamber, an optics plate, charged particle optics mounted to the optics plate, and mounting members coupled between the optics plate and a chamber wall. The mounting members are configured for isolating the optics plate from deformation of the chamber wall, as may occur due to a pressure differential between the chamber interior and the environment outside the chamber. The isolation may prevent deformation from affecting the alignment and positioning of the charged particle optics. The charged particles may, for example, be ions or electrons. Thus, the apparatus may be utilized, for example, in analytical instruments such as for mass spectrometry, or inspection instruments such as for electron microscopy.

20 Claims, 8 Drawing Sheets

(56) References Cited

OTHER PUBLICATIONS

Jiming Huang and Yangmin Li; Design and Analysis of a Completely Decoupled Compliant Parallel XY Micro-motion Stage; Proceedings of the 2010 IEEE International Conference on Robotics and Biomimetics, Dec. 14-18, 2010, Tianjin, China.

Yangmin Li and Qingsong Xu; A Novel Design and Analysis of a 2-DOF Compliant Parallel Micromanipulator for Nanomanipulation; IEEE Transactions on Automation Science and Engineering, vol. 3, No. 3, Jul. 2006.

International Search Report and Written Opinion dated Dec. 23, 2015 for related International Application No. PCT/US2015/050380.

* cited by examiner

ISOLATION OF CHARGED PARTICLE OPTICS FROM VACUUM CHAMBER DEFORMATIONS

TECHNICAL FIELD

The present invention relates to isolating charged particle optics mounted in a vacuum chamber from deformations of the vacuum chamber to maintain alignment of the charged particle optics. The charged particle optics and vacuum chamber may be of the type utilized in analytical or inspection instruments such as, for example, mass spectrometers and/or electron microscopes.

BACKGROUND

A vacuum chamber is a structure enclosing an interior in a fluid-sealed manner such that the interior may be maintained at a desired vacuum-level fluid pressure. The structure may include one or more walls defining the boundaries of the interior. The ambient pressure of the environment external to the vacuum chamber may be a much higher pressure, for example atmospheric pressure (760 Torr). Thus, the pressure differential across the chamber wall(s) may be quite large, spanning several orders of magnitude for example. The force imparted to the chamber wall is proportional to the exposed surface area of the chamber wall and the pressure differential, $F=A(P_{ATM}-P_{VAC})$, and will induce stress and strain in the chamber wall. When the size of the vacuum chamber is large compared to the thickness of its walls, the forces experienced due to the pressure differential will induce strains on the walls capable of causing large deformations in the walls, for example on the order of a few micrometers (μm) to hundreds of micrometers (a fraction of a millimeter (mm)).

Analytical instruments utilize vacuum chambers to facilitate the operation of charged particle optics components (or simply "optics") in controlling particle motion, such as shaping, steering, accelerating, or decelerating a charged particle beam, for example an ion beam, electron beam, etc. For such applications, one or more charged particle optics components may be mounted to the inside of one or more walls of the vacuum chamber. The charged particle optics often require precise alignments, with alignment tolerances on the order of one or more micrometers to tens of micrometers. A deformation of the chamber wall may cause a misalignment in the charged particle optics.

One example of such an analytical instrument is a mass spectrometry (MS) system, which analyzes a sample of interest to produce a mass spectrum, i.e., a series of peaks indicative of the relative abundances of detected ions as a function of their mass-to-charge ratios (also referred to more briefly as "m/z ratios," or more simply as "masses"). The MS system typically includes, in order of process flow, an ion source for ionizing molecules of the sample, followed by one or more intermediate ion processing devices providing various functions, followed by a mass analyzer for separating ions based on their differing m/z ratios, followed by an ion detector at which the mass-sorted ions arrive. The ion source may operate at vacuum or atmospheric pressure, depending on design. The rest of the devices in the sequence include vacuum chambers. The vacuum chambers are in fluid communication with a vacuum system via sealed interfaces. The vacuum system includes one or more vacuum pumps, which may be a combination of different types of pumps as needed to achieve the required vacuum levels. The vacuum system is configured to provide independently controlled vacuum-level gas pressures in the respective vacuum chambers. The vacuum system may be operated such that each chamber successively reduces the gas pressure below the level of the preceding chamber, ultimately down to the very low pressure (very high vacuum) required for operating the mass analyzer (e.g., ranging from $10^{-4}$ to $10^{-9}$ Torr). Thus, the MS system directs an ion beam through one or more vacuum chambers and ultimately to the vacuum chamber containing the mass analyzer. For this purpose, various ion optics are mounted in the vacuum chambers. In vacuum chambers susceptible to deformation, the ion optics must be mounted in a manner that sufficiently isolates them from the deformation. Otherwise, the ion optics may be moved out of proper alignment and adversely affect control of the ion beam, which may result in loss of ions, impaired and/or inaccurate beam transmission, degradation of the analytical data acquired, and other problems.

Therefore, there is a need for isolating charged particle optics from deformations of the vacuum chamber in which the charged particle optics are mounted.

SUMMARY

To address the foregoing problems, in whole or in part, and/or other problems that may have been observed by persons skilled in the art, the present disclosure provides methods, processes, systems, apparatus, instruments, and/or devices, as described by way of example in implementations set forth below.

According to one embodiment, a charged particle processing apparatus includes: a vacuum chamber comprising a chamber wall; an optics plate; charged particle optics mounted to the optics plate; and a plurality of mounting members coupled between the optics plate and the chamber wall, wherein the mounting members are configured for cooperatively constraining six degrees of freedom of the optics plate.

According to another embodiment, a charged particle processing apparatus includes: a vacuum chamber comprising a chamber wall; an optics plate; charged particle optics mounted to the optics plate; and a plurality of mounting members coupled between the optics plate and the chamber wall, wherein at least one of the mounting members is movable or flexible in at least one direction in response to deformation of the chamber wall.

According to another embodiment, a mass spectrometry (MS) system includes: an ion source; a mass spectrometer; and a charged particle processing apparatus according to any of the embodiments disclosed herein, wherein the MS system defines an ion path from the ion source to the mass analyzer, and the ion path passes through the vacuum chamber.

In some embodiments, the ion processing apparatus is positioned at or is part of the ion source. In other embodiments, the ion processing apparatus is positioned between the ion source and the mass spectrometer. In other embodiments, the ion processing apparatus is positioned at or is part of the mass spectrometer.

According to another embodiment, a method for assembling a charged particle processing apparatus includes: mounting an optics plate to a platform by coupling a plurality of mounting members between the optics plate and the platform, wherein the platform is external to a vacuum chamber of the charged particle processing apparatus; assembling charged particle optics on the optics plate; aligning the charged particle optics; decoupling the mounting members from the platform; transferring the optics plate from the platform to the vacuum chamber; and mounting the optics plate to a chamber wall of the vacuum chamber by coupling the mounting members to the chamber wall.

In some embodiments, the mounting members are coupled between the optics plate and the chamber wall in substantially the same spatial arrangement as the mounting members were coupled between the optics plate and the platform.

In some embodiments, the mounting members are configured for cooperatively constraining six degrees of freedom of the optics plate, and at least one of the mounting members is movable or flexible in at least one direction in response to deformation of the chamber wall.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE DRAWINGS

The invention can be better understood by referring to the following figures. The components in the figures are not necessarily to scale, emphasis instead being placed upon illustrating the principles of the invention. In the figures, like reference numerals designate corresponding parts throughout the different views.

DETAILED DESCRIPTION

Figure 1A:
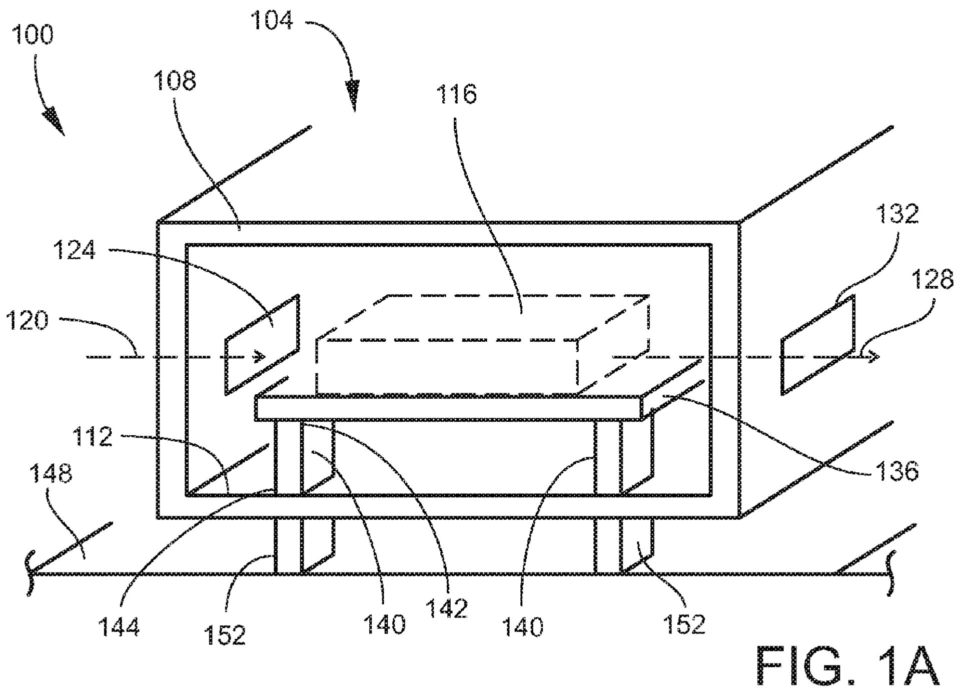
FIG. 1A is a schematic perspective view of an example of a charged particle processing apparatus according to some embodiments.
Figure 1B:
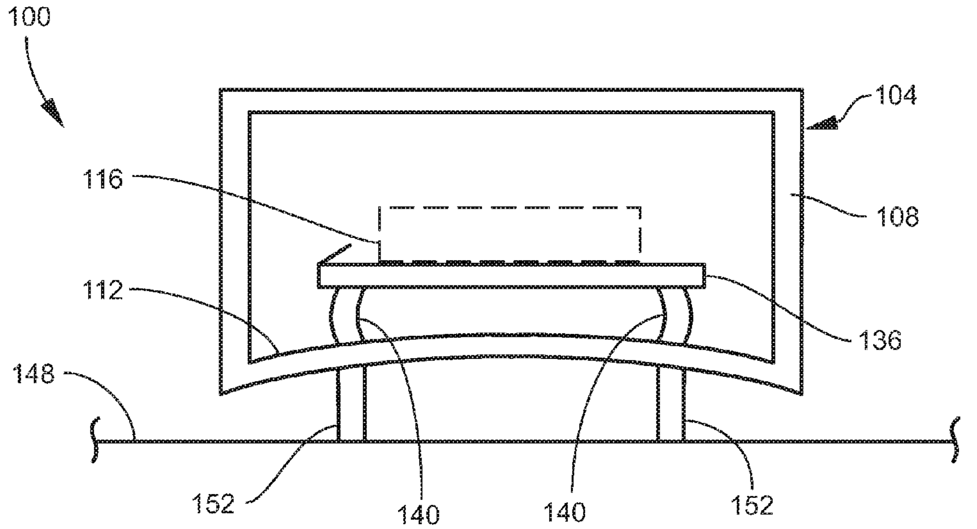
FIG. 1B is a schematic elevation view of the charged particle processing apparatus illustrated in FIG. 1A, after a vacuum chamber wall has deformed.

FIGS. 1A and 1B are schematic perspective and elevation views, respectively, of an example of a charged particle apparatus according to some embodiments. The charged particle apparatus generally may be any apparatus that processes charged particles (e.g., ions, electrons, etc.) in a controlled vacuum environment, such as by affecting the motion or energy of, causing an interaction or reaction with, measuring, detecting, or sensing the charged particles. In some embodiments, the vacuum may be high vacuum (on the order of, for example, $10^{-4}$ Torr) or very high vacuum (on the order of, for example, $10^{-9}$ Torr). The charged particle apparatus generally may include a vacuum chamber and charged particle optics disposed in the vacuum chamber. The charged particle optics (or, more simply, "optics") may be mounted to one or more inside surfaces of the vacuum chamber via mounting members, as described by examples below. In the context of the present disclosure, the term "charged particle optics" or "optics" may refer to a single optics device or component, or a plurality of optics devices or components (e.g., an optics system, assembly, or ensemble). The plurality of optics devices or components may be a combination of one or more different types of optics devices or components. The optics may be active (powered by an input of energy) or passive. The optics may be electrostatic, electromagnetic, or magnetic optics. Generally, optics are configured for affecting the motion of charged particles in a desired manner, or detecting or measuring charged particles.

For purposes of providing examples within the broad aspects of the subject matter taught herein, the charged particle apparatus is illustrated in FIGS. 1A and 1B and described below in the context of an ion processing apparatus 100. This is done with the understanding that the charged particle apparatus is not limited to being an ion processing apparatus but instead may be another type of charged particle apparatus, and thus that the charged particle optics are not limited to being ion optics, as noted elsewhere in the present disclosure.

The ion processing apparatus 100 generally may be any apparatus that processes ions in a controlled vacuum environment. Examples of ion processing apparatuses include, but are not limited to, ion transfer devices, ion guides, beam shaping devices, ion coolers, ion fragmentation devices, ion traps, mass analyzers, etc. The ion processing apparatus 100 includes a vacuum chamber 104. The vacuum chamber 104 includes a structure enclosing a chamber interior in a fluid-sealed manner sufficient for enabling the internal gas pressure in the chamber interior to be controlled and maintained at a desired high or very high vacuum level. The structure may include one or more chamber walls 108. In FIGS. 1A and 1B, the front portion of the structure is omitted to render the chamber interior visible. The structure generally may have any three-dimensional geometry defining the chamber interior. In the illustrated embodiment, the structure has a rectilinear (parallelpiped) geometry, although in other embodiments may include curved features. In some embodiments, as illustrated, the geometry is such as to provide a flat bottom inside surface 112. The structure may also include one or more reinforcing members (not shown) on one more of the outer sides and/or inner sides of the vacuum chamber 104, such as ribs, plates, gussets, trusses, beams, etc., as appreciated by persons skilled in the art.

The ion processing apparatus 100 further includes ion optics 116. Examples of ion optics include, but are not limited to, electrodes, lenses, ion deflectors, ion gates, ion guides, ion funnels, ion beam shapers, ion slicers, ion beam concentrators, ion mirrors, and ion detectors.

In some embodiments, the ion processing apparatus 100 is configured for transmitting an ion beam 120 from another device (external to the vacuum chamber 104) to the ion optics 116, in which case the ion processing apparatus 100 includes an ion inlet 124 aligned with the ion optics 116. The ion inlet 124 may include an aperture with a fluid-sealed interface (e.g., a feed-through), and may also include or function as ion optics. In some embodiments, the ion processing apparatus 100 is configured for transmitting an ion beam 128 from the ion optics 116 to another device, in which case the ion processing apparatus 100 includes an ion outlet 132 aligned with the ion optics 116. The ion outlet 132 may likewise include a sealed aperture and may also include or function as ion optics. The ion processing apparatus 100 also includes a vacuum port (not shown) formed through the chamber wall 108 that fluidly couples the ion processing apparatus 100 with a vacuum system. Depending on the embodiment, the ion processing apparatus 100 may include other sealed apertures for such purposes as providing a gas inlet, accommodating electrical wiring, etc.

The ion processing apparatus 100 further includes an optics plate 136 on which the ion optics 116 are arranged and mounted in fixed, precisely aligned positions. The optics plate 136 may provide a flat surface supporting the ion optics 116, and may be positioned at a precise elevation relative to the inside bottom surface 112 and/or the ion inlet 124 and/or the ion outlet 132 of the vacuum chamber 104. The optics plate 136 may include various mounting features (holes, brackets, etc.) for the ion optics 116. In FIG. 1A, the optics plate 136 is horizontally oriented by example only. In other embodiments, the optics plate 136 may be vertically oriented or oriented at an angle to the horizontal or vertical plane. Moreover, the optics plate 136 is not limited to being mounted to the inside bottom surface 112 but rather may be mounted to any of the inside surfaces and, further, may be mounted to more than one inside surface.

The ion processing apparatus 100 further includes a plurality of inside mounting members 140 coupled between the optics plate 136 and one or more inside surfaces of the vacuum chamber 104. By example only, FIG. 1A illustrates inside mounting members 140 coupled between the optics plate 136 and the bottom inside surface 112 of the vacuum chamber 104. Each inside mounting member 140 may include a first end 142 securely attached to the optics plate 136 and a second end 144 securely attached to the bottom inside surface 112 (or, in other embodiments, to another inside surface of the vacuum chamber 104). In some embodiments, one or more of the inside mounting members 140 may be attached or coupled using fasteners such as, for example, bolts.

Generally, the inside mounting members 140 have a configuration (i.e., structure, geometry, and material composition) effective for isolating the optics plate 136, and thus the ion optics 116, from any deformations that may develop in the structure of the vacuum chamber 104 as a result of a pressure differential between the chamber interior and the ambient. The isolation prevents such deformations from causing any appreciable movement (e.g., translation, rotation, bending, twisting) of the optics plate 136 (and thus the ion optics 116) in any direction, and/or development of any appreciable stress and/or strain in the optics plate 136. Hence, the isolation prevents such deformations from causing unwanted misalignments in the ion optics 116 during operation. In the present context, the term "appreciable" takes into account that some very small movement and/or stress/strain may be permitted within a range of tolerance that would not be detrimental to maintaining the required alignment of the ion optics 116. In other words, any such movement or stress/strain would be considered negligible and the isolation achieved would still be considered effective.

Generally, any number of inside mounting members 140 may be provided, and the inside mounting members 140 may be arranged in any pattern on the optics plate 136. In some embodiments, the number, arrangement, and respective configurations of the inside mounting members 140 are implemented as needed for providing a properly kinematically constrained support system for effective isolation and location of the optics plate 136 (and thus the ion optics 116). A properly constrained kinematic system provides constraints on six degrees of freedom (DOFs), corresponding to three translations along the x-axis, y-axis and z-axis, respectively, and three rotations about the x-axis (in the y-z plane), y-axis (in the x-z plane) and z-axis (in the x-y plane), respectively. In typical embodiments, at least three inside mounting members 140 are provided, two of which are shown in FIG. 1A. In some embodiments, the number of inside mounting members 140 provided ranges from three to six. Generally, three to six mounting members 140 are utilized to realize a properly constrained kinematic system, although in the broad aspects of the subject matter disclosed herein the total number of inside mounting members 140 is not limited to three to six. Examples of embodiments of inside mounting members 140 are described below.

As shown in FIG. 1A, the ion processing apparatus 100 may be disposed on a base or platform 148. The base 148 may include any surface appropriate for supporting the ion processing apparatus 100. As examples, the base 148 may be a structural frame, table, bench, or floor. Outside mounting members 152 may be coupled between the vacuum chamber 104 and the base 148. The number of outside mounting members 152 provided may be greater or less than the number of inside mounting members 140. The configuration of the outside mounting members 152 may be the same as, similar to, or different from that of the inside mounting members 140. One or more of the outside mounting members 152 may be located directly under or proximate to one or more of the inside mounting members 140. In some embodiments, at least a subset of the outside mounting members 152 have the same spatial arrangement as that of the inside mounting members 140, with each outside mounting member 152 of the subset being located directly under or proximate to a corresponding inside mounting member 140, as partially illustrated in FIG. 1A. This embodiment ensures that while the vacuum chamber 104 may express deformations caused by the differential vacuum created between the outside and inside of the vacuum chamber 104, the location of the optics plate 136 and ion optics 116 will remain unchanged relative to the base 148. This in turn will ensure that alignment between a system or device adjacent to the vacuum chamber 104 (e.g., a system or device communicating with the vacuum chamber 104 via the ion inlet 124 or ion outlet 132), and the optics 116 inside the vacuum chamber 104, will be maintained.

FIG. 1B is a schematic elevation view of the ion processing apparatus 100. FIG. 1B illustrates an example of deformation of the vacuum chamber 104. For simplicity, FIG. 1B illustrates deformation only of the bottom side of the vacuum chamber 104, including the bottom inside surface 112 which, in the present example, is the inside surface that supports the optics plate 136. It will be understood, however, that the pressure differential may be generally isotropic such that deformation of the top side and lateral sides of the vacuum chamber 104 may also occur. In this example, from the perspective of FIG. 1B, the bottom side of the vacuum chamber 104 has bowed or caved in toward the chamber interior. In particular, the bottom inside surface 112 has moved from a position that is nominally flat and parallel with the optics plate 136 as shown in FIG. 1A to the deformed position shown in FIG. 1B. The profile of the deformation is not necessarily uniform, but rather may be irregular and possibly localized to (and/or more pronounced at) certain regions of the chamber structure. The profile of the deformation may depend on the geometry of the vacuum chamber 104 and the configuration of any reinforcing members provided. Relative to the scale of the ion processing apparatus 100 illustrated in FIG. 1B, the extent of the deformation is exaggerated for illustrative purposes.

FIG. 1B also illustrates an example of a response of the inside mounting members 140 to the deformation. Generally, the inside mounting members 140 are configured for maintaining the optics plate 136 (and thus the ion optics 116) free of stress/strain (i.e., no deformations), and in the same relative fixed position to the base 148 (within an acceptable range of tolerance, as noted above), even after the bottom inside surface 112 has deformed. In some embodiments, this configuration may be implemented by each inside mounting member 140 (or a portion thereof) being movable and/or flexible (or compliant) in at least one direction so as to accommodate or counteract deformation of the bottom inside surface 112. The resultant movement and/or flexure of the inside mounting member 140 may entail translation along one or more axes and/or rotation about one or more axes. Alternatively or additionally, movement of each inside mounting member 140 may entail one or more types of deformation of at least a portion of the inside mounting member 140, such as bending, twisting, compressing, stretching, and/or multiple rotations and/or translations. In some embodiments, the second end 144 of each inside mounting member 140 may move and/or flex in a manner complementary to the movement of the bottom inside surface 112, while the first end 142 of each inside mounting member 140 remains (substantially) fixed in the position required for avoiding deformation of the optics plate 136 and maintaining alignment of the ion optics 116. In other embodiments, both the first end 142 and the second end 144 of each inside mounting member 140 may move and/or flex in a manner that results in avoiding deformation of the optics plate 136 maintaining alignment of the ion optics 116.

As noted above, the configuration of the outside mounting members 152 may be the same as or similar to that of the inside mounting members 140, and thus may respond to vacuum chamber deformation in the same or similar manner. Alternatively, the outside mounting members 152 may be configured primarily for isolating vibrations between the supporting base 148 and the system 100, in which case the outside mounting members 152 may move or deform to a more limited degree in response to vacuum chamber deformation as compared to the inside mounting members 140.

Figure 2A:
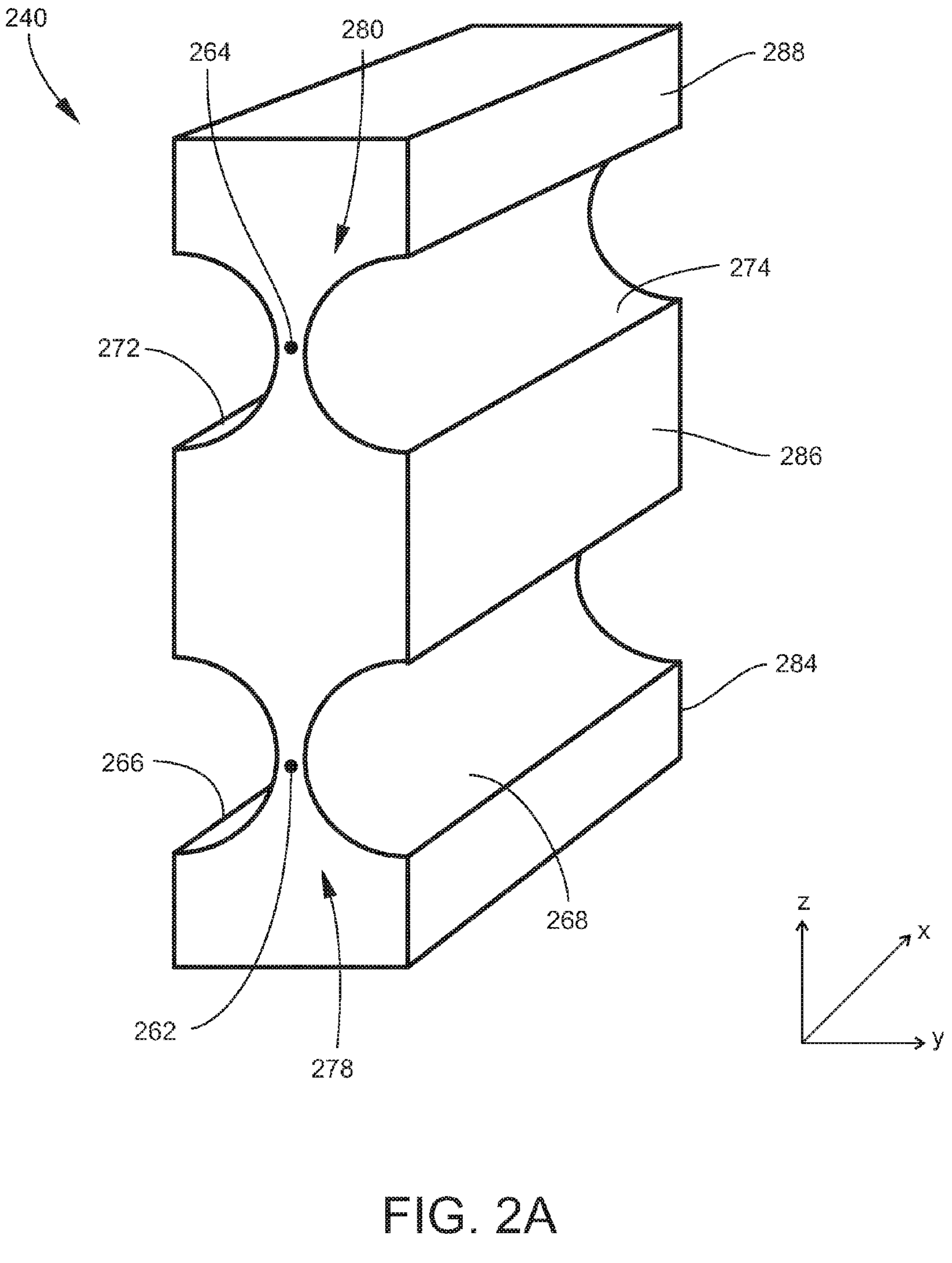
FIG. 2A is a perspective view of an example of a mounting member according to one embodiment.

FIG. 2A is a perspective view of one non-limiting example of an inside mounting member 240 according to one embodiment. For illustrative purposes FIG. 2A includes a Cartesian frame of reference, consisting of mutually orthogonal x- and y-axes (or first and second transverse axes) defining a transverse plane, and a z-axis orthogonal to the transverse plane and corresponding to elevation from the perspective of FIGS. 1A, 1B, 2A, and 2B. The x-axis, y-axis, and z-axis may also be referred to as the x-direction (or first transverse direction), y-direction (or second transverse direction), and z-direction, respectively. The inside mounting member 240 has a length along the x-axis, a width along the y-axis, and a height along the z-axis. In this embodiment, the inside mounting member 240 is configured to be stiff (rigid) along the z-axis, stiff along the x-axis, and movable along the y-axis. As described by example below, such a configuration may be realized through the design of the geometry of the inside mounting member 240. In the present context, "stiff" or "rigid" means that the inside mounting member 240 will not appreciably move in response to force/pressure applied in the indicated direction (the x- and z-directions in the present embodiment). Nonetheless, the inside mounting member 240 may be configured to exhibit a slight amount of elastic deformation in the x- and z-directions. For example, the inside mounting member 240 may be composed of a material that is flexible enough to allow for the necessary deformations without undergoing plastic deformation, such as, for example, Aluminum 6061 T6 or Stainless steel 301 or 302. However, the inside mounting member 240 may be configured so as to be significantly more movable in the selected other direction (the y-direction in the present embodiment). In some embodiments this is accomplished by transforming two rotations into a linear displacement, e.g., by incorporating a dual (double) hinge into the inside mounting member 240. In some embodiments, the dual hinge may be a dual flexure hinge.

In the present embodiment, the inside mounting member 240 may be movable along the y-axis as a result of being bendable or pivotable about the x-axis (i.e., bendable or pivotable in the y-z plane) at one or more elevations on the z-axis. For example, in the illustrated embodiment the inside mounting member 240 is bendable about two pivot axes, a first pivot axis 262 and a second pivot axis 264, parallel with a reference x-axis (z=0) that is located at the bottom end of the inside mounting member 240 in FIG. 2A. In this example, the bending attribute is implemented by forming two channels along the x-axis in the two sides of the inside mounting member 240 that lie in the x-z plane. Specifically, the inside mounting member 240 includes an opposing pair of first channels 266 and 268 positioned on opposite sides of the first pivot axis 262, and an opposing pair of second channels 272 and 274 positioned on opposite sides of the second pivot axis 264. As a result, each of the opposing sides of the inside mounting member 240 in the y-z plane has a first region 278 of reduced cross-section (e.g., reduced length between the first channels 266 and 268), and thus reduced moment of inertia, and through which the first pivot axis 262 passes. Additionally, each of the opposing sides of the inside mounting member 240 in the y-z plane has a second region 280 of reduced cross-section (e.g., reduced length between the second channels 272 and 274), and thus reduced moment of inertia, and through which the second pivot axis 264 passes. The channels 266, 268, 272, and 274 may be curved as illustrated, or polygonal, or include both curved and polygonal sections.

In some embodiments, the inside mounting member 240 of the illustrated embodiment may be considered as being a compliant mechanism comprising two flexure joints (kinematic pairs) and three links. Specifically, the inside mounting member 240 includes a first flexure joint comprising the first pivot axis 262 and surrounding first region 278, and a second flexure joint comprising the second pivot axis 264 and surrounding second region 280. The first flexure joint interconnects two links, a first (lower) section 284 (or first link) and a second (intermediate) section 286 (or second link) of the inside mounting member 240. The second flexure joint also interconnects two links, the second link section 286 and a third (upper) section 288 (or third link) of the inside mounting member 240. Each flexure joint may act as a revolute (or hinged) joint that provides only one degree of freedom (DOF) on the relative movement between the two links connected to that flexure joint. At each flexure joint, the sole degree of freedom is rotation in the y-z plane. Relative rotation of the interconnected links about the two flexure joints may be transformed into lateral displacement along the y-axis, as described above. Collectively, the dual hinge configuration of the inside mounting member 240 provides two degrees of freedom while constraining translation along the x-axis and z-axis and rotation about the y-axis and z-axis.

In other embodiments, the inside mounting member 240 may be configured to include a single hinge or single flexure hinge. For example, the inside mounting member 240 may include a single pair of opposing channels defining a single region of reduced cross-section and thus a single pivot axis. In this case, the inside mounting member 240 would provide one degree of freedom (rotation about the single pivot axis).

Figure 2B:
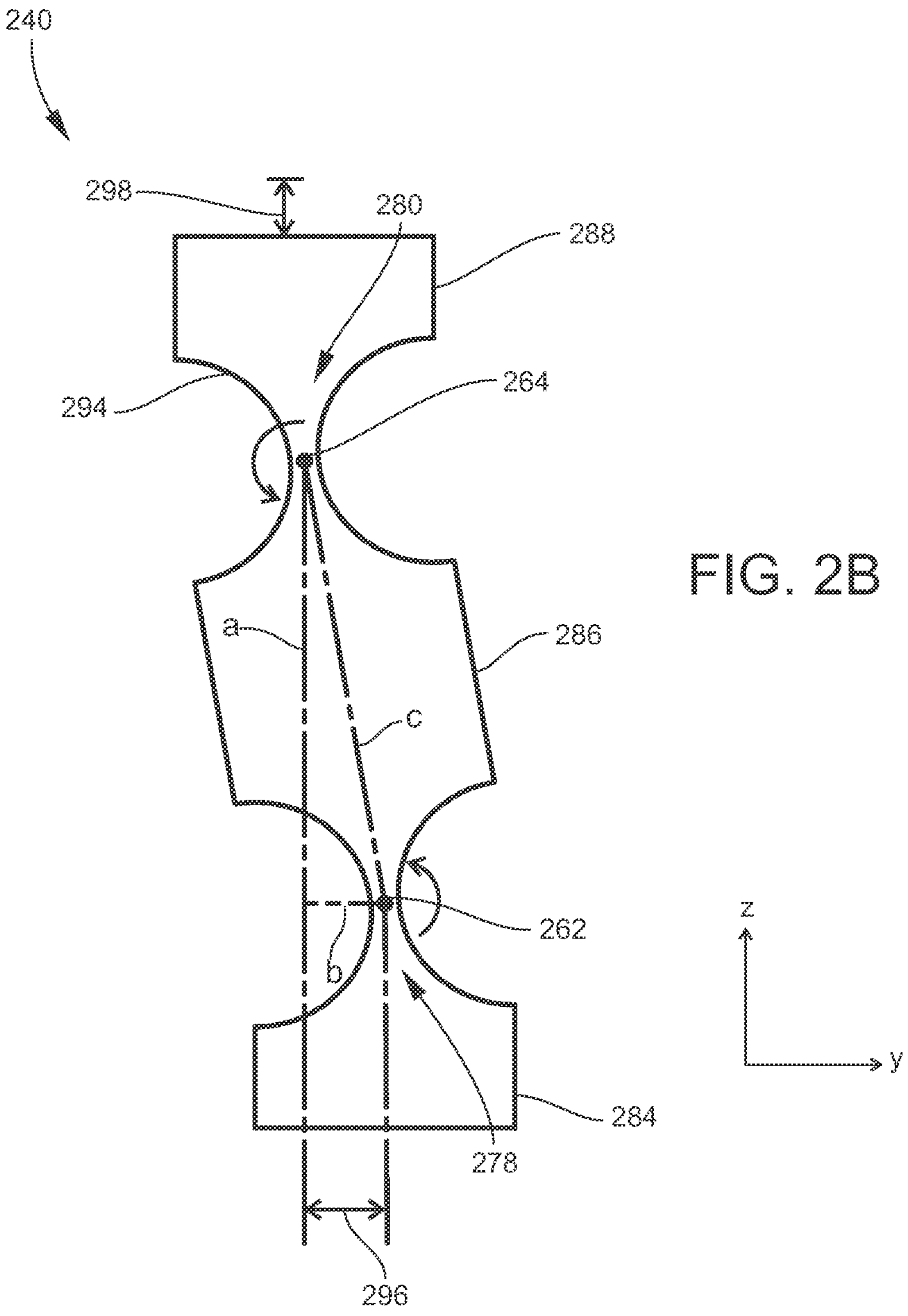
FIG. 2B is an elevation view of the mounting member illustrated in FIG. 2A, after moving in response to deformation of an underlying vacuum chamber wall to which the mounting member is attached.

FIG. 2B is an elevation view of the inside mounting member 240 in the y-z plane, after moving or bending in response to an example of a mode of deformation of the underlying bottom inside surface 112 of the vacuum chamber 104 to which it is attached (FIG. 1B). In this example, the deformation of the bottom inside surface 112 has in effect caused the second section 286 to rotate relative to the first section 284 about the first pivot axis 262 as indicated by an arrow 292, and the second section 286 to rotate relative to the third section 288 about the second pivot axis 264 as indicated by an arrow 294. In the illustrated example, the deformation results in a lateral (horizontal) displacement of the inside mounting member 240 along the y-axis at the first section 284 as indicated by an arrow 296, and a much smaller elevational (vertical) displacement of the inside mounting member 240 along the z-axis at the third section 288 as indicated by an arrow 298.

As an example, assume the distance between the two pivot axes 262 and 264 is 25.4 mm (about 1 inch) and the lateral displacement 296 after deformation is 10 μm (0.01 mm). After the lateral displacement 296 has occurred, the distance between the two pivot axes 262 and 264 corresponds to the hypotenuse c of a right triangle. The horizontal leg b of the right triangle corresponds to the lateral displacement 296 and the other leg a lies along the z-axis (the orientation of the distance between the two pivot axes 262 and 264 prior to lateral displacement). By the Pythagorean theorem, $a=(c^2-b^2)^{1/2}$. Hence in the present example, $a=((25.4)^2-(0.01)^2)^{1/2}=25.399998$ mm. The difference between a and c corresponds to the elevational displacement 298 of the optics plate 136 as a result of the deformation. In this example, the elevational displacement 298 is 25.4−25.399998=0.000002 mm (0.002 μm), and thus is negligible. More generally, considering the scale of deformations contemplated for a wide range of applications utilizing the charged particle processing apparatus, the elevational displacement 298 will be within the range of acceptable tolerances for the optics 116 supported by the optics plate 136. More significantly, the provision of inside mounting members 240 according to embodiments disclosed herein may prevent deformations of the vacuum chamber walls from being translated into deformations or distortions of the optics plate 136 itself, thus avoiding misalignments in the optics 116.

It will be noted that the lateral displacement 296 and elevation displacement 298 illustrated in FIG. 2B are merely examples. In other embodiments, all or part of the lateral displacement 296 (left or right) may occur at the third section 288, and all or part of the elevation displacement 298 (up or down) may occur at the first section 284.

According to embodiments of the present disclosure, a plurality of inside mounting members may be provided to support the optics plate 136 as noted above. All of the inside mounting members may be coupled to the same inside surface of the vacuum chamber 104, as in the embodiment illustrated by example in FIGS. 1A and 1B. Alternatively, the inside mounting members may be respectively coupled to one or more different inside surfaces as noted above. One or more of the inside mounting members may be configured according to the embodiment illustrated in FIGS. 2A and 2B (inside mounting member 240). One or more other inside mounting members may be configured so as to impose constraints on less or more degrees of freedom than that imposed by the inside mounting member(s) 240 illustrated in FIGS. 2A and 2B, so long as the combination of different inside mounting members results in a properly kinematically constrained support system. Providing the proper combination of inside mounting members results in a properly kinematically constrained support system in which all six degrees of freedom are constrained, thereby providing effective isolation and location of the optics plate 136 (and thus the optics 116).

In some embodiments, the combination of inside mounting members provides exactly six constraints on the respective six degrees of freedom, no more and no less, so that the system is neither under-constrained nor over-constrained. An under-constrained system would allow the optics plate 136 to move (translate or rotate) in the direction of the missing constraint, while an over-constrained system would induce stresses/strains that may be significant enough to cause the optics plate 136 to deform. In some embodiments, the combination of inside mounting members may provide a quasi-kinematic (or pseudo-kinematic, or semi-kinematic) system that is slightly over-constrained but not enough to cause the optics plate 136 to deform appreciably in response to deformation of the vacuum chamber 104. Moreover, in practice one or more of the inside mounting members may need to be coupled to the optics plate 136 and/or the vacuum chamber 140 at least in part through the use of fasteners such as bolts, which may introduce some over-constraint into the system.

Figure 3A:
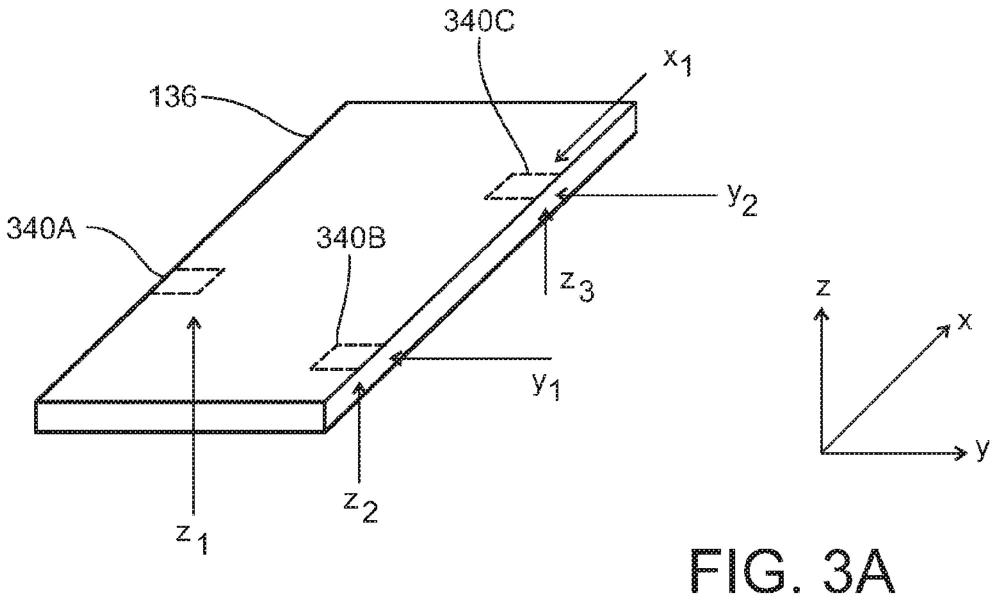
FIGS. 3A and 3B are schematic perspective views of an optics plate and examples of different arrangements and configurations of mounting members supporting the optics plate, according to some embodiments.
Figure 3B:
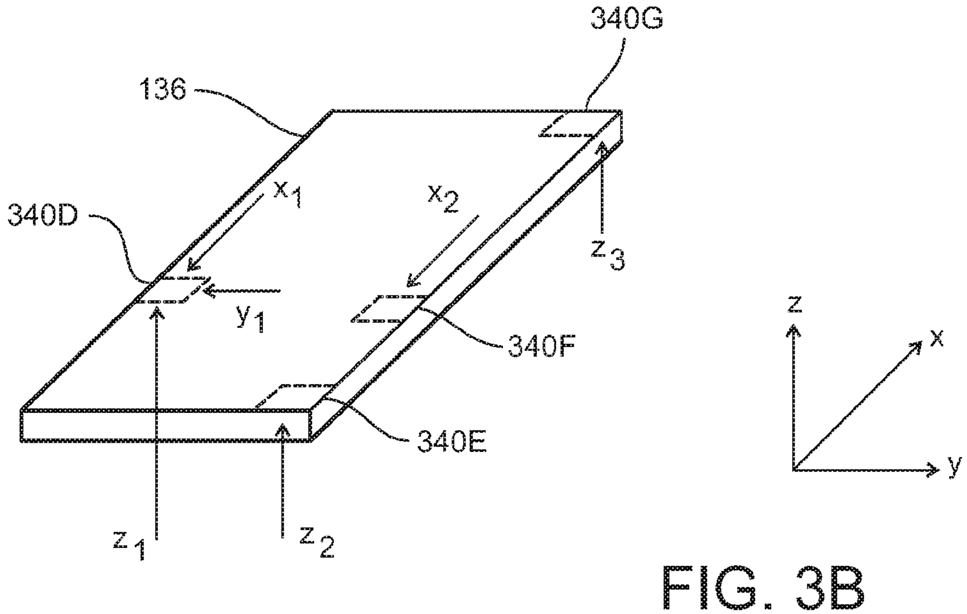

FIGS. 3A and 3B are schematic perspective views of the optics plate 136 and non-limiting examples of different arrangements and configurations of inside mounting members. The inside mounting members are schematically depicted by their mounting locations at the optics plate 136 and the types of translational constraints they impose on the movement of the optics plate 136. Generally, the mounting locations have been arbitrarily selected in FIGS. 3A and 3B, although certain arrangements of relative mounting locations may be desirable for constraining rotation about one or more axes, as appreciated by persons skilled in the art.

FIG. 3A illustrates one example of providing three inside mounting members, specifically a first inside mounting member 340A, a second inside mounting member 340B, and a third inside mounting member 340C, which may be spaced at distances from each other. The first inside mounting member 340A is located at a side of the optics plate 136 opposite to the side at which the second inside mounting member 340B and third inside mounting member 340C are located. In a case where, as illustrated, the optics plate 136 is polygonal, the sides at which the inside mounting members 340A, 340B, and 340C are located may be edges. In the present context, the term "located at" may encompass the term "located proximate to." That is, a given inside mounting member need not be mounted directly at a side (or edge), but instead may be mounted at some distance inward from that side. Typically, if a given inside mounting member is located at (or proximate to) a given side, then it is located closer to that given side than to the side opposite to that given side. In a case where the optics plate 136 is polygonal, one or more of the inside mounting members 340A, 340B, and 340C may be located at (or proximate to) one or more corners of the optics plate 136.

In FIG. 3A, the first inside mounting member 340A is configured for providing a constraint only in a direction along the z-axis, as depicted by the arrow $z_1$. That is, the first inside mounting member 340A is rigid or stiff along the z-axis. For example, in the illustrated embodiment in which the optics plate 136 is horizontally oriented, the first inside mounting member 340A simply supports the optics plate 136 from below. Thus, the first inside mounting member 340A may provide a single point (or small area) of contact with the optics plate 136, such as by providing a spherical surface or small planar surface. The first inside mounting member 340A does not itself provide any constraint on translation of the optics plate 136 along the x-axis or y-axis, and thus may be movable or flexible in these directions. Moreover, the first inside mounting member 340A does not by itself provide any constraint on rotation of the optics plate 136 about any of the x-axis, y-axis, or z-axis.

The second inside mounting member 340B is configured for providing constraints in directions along the y-axis and z-axis, as depicted by the arrows $y_1$ and $z_2$. For example, the second inside mounting member 340B may include a rigid or stiff surface that abuts the side or edge of the optics plate 136 so as to support the optics plate 136 in a direction along the y-axis. The second inside mounting member 340B does not by itself provide any constraint on translation of the optics plate 136 along the x-axis, or on rotation of the optics plate 136 about any of the x-axis, y-axis, or z-axis.

The third inside mounting member 340C is configured for providing constraints in directions along each of the x-axis, y-axis and z-axis, as depicted by the arrows $x_1$, $y_2$, and $z_3$.

Further, the inside mounting members 340A, 340B, and 340C are arranged to provide constraints on rotation of the optics plate 136 about each of the x-axis, y-axis and z-axis. Rotation about the x-axis is constrained by the first inside mounting member 340A ($z_1$) and the second inside mounting member 340B ($z_2$), or the first inside mounting member 340A ($z_1$) and the third inside mounting member 340C ($z_3$). Rotation about the y-axis is constrained primarily by the second inside mounting member 340B ($z_2$) and the third inside mounting member 340C ($z_3$). Rotation about the z-axis is constrained by the second inside mounting member 340B ($y_1$) and the third inside mounting member 340C ($y_2$).

It can thus be seen that the inside mounting members 340A, 340B, and 340C are configured to provide a total of six constraints ($x_1+y_1+y_2+z_1+z_2+z_3$), and therefore provide a properly constrained kinematic system for supporting the optics plate 136.

FIG. 3B illustrates one example of providing four mounting members, specifically a first inside mounting member 340D, a second inside mounting member 340E, a third inside mounting member 340F, and a fourth inside mounting member 340G. The first inside mounting member 340D is configured for providing constraints in directions along each of the x-axis, y-axis and z-axis, as depicted by the arrows $x_1$, $y_1$, and $z_1$. The second inside mounting member 340E is configured for providing a constraint only in a direction along the z-axis, as depicted by the arrow $z_2$. The third inside mounting member 340F is configured for providing a constraint only in a direction along the x-axis, as depicted by the arrow $x_2$. The fourth inside mounting member 340G is configured for providing a constraint only in a direction along the z-axis, as depicted by the arrow $z_3$. Further, rotation about the x-axis is constrained by the first inside mounting member 340D ($z_1$) and the second inside mounting member 340B ($z_2$), or the first inside mounting member 340D ($z_1$) and the fourth inside mounting member 340G ($z_3$). Rotation about the y-axis is constrained primarily by the second inside mounting member 340B ($z_2$) and the third inside mounting member 340F ($z_3$). Rotation about the z-axis is constrained by the first inside mounting member 340D ($x_1$) and the third inside mounting member 340F ($x_2$). It can thus be seen that the inside mounting members 340D, 340E, 340F and 340G are configured to provide a total of six constraints ($x_1+x_2+y_1+z_1+z_2+z_3$), and therefore provide a properly constrained kinematic system for supporting the optics plate 136.

It will be appreciated that many other configurations (and relative mounting locations) for the inside mounting members are possible, with different combinations of constraints on degrees of freedom, as long as the mounting system provides a total number of constraints of six and, further, as long as the mounting system is able to decouple deformations of the vacuum chamber from the optics plate mounted in the vacuum chamber. The configurations described above and illustrated in FIGS. 2A to 3B are merely examples. Moreover, the total number of inside mounting members may be five or six (or greater than six), again as long as the total number of constraints is six (or at least as long as the resulting system is not appreciably over-constrained) and the optics plate is effectively isolated from deformations of the vacuum chamber.

Figure 4A:
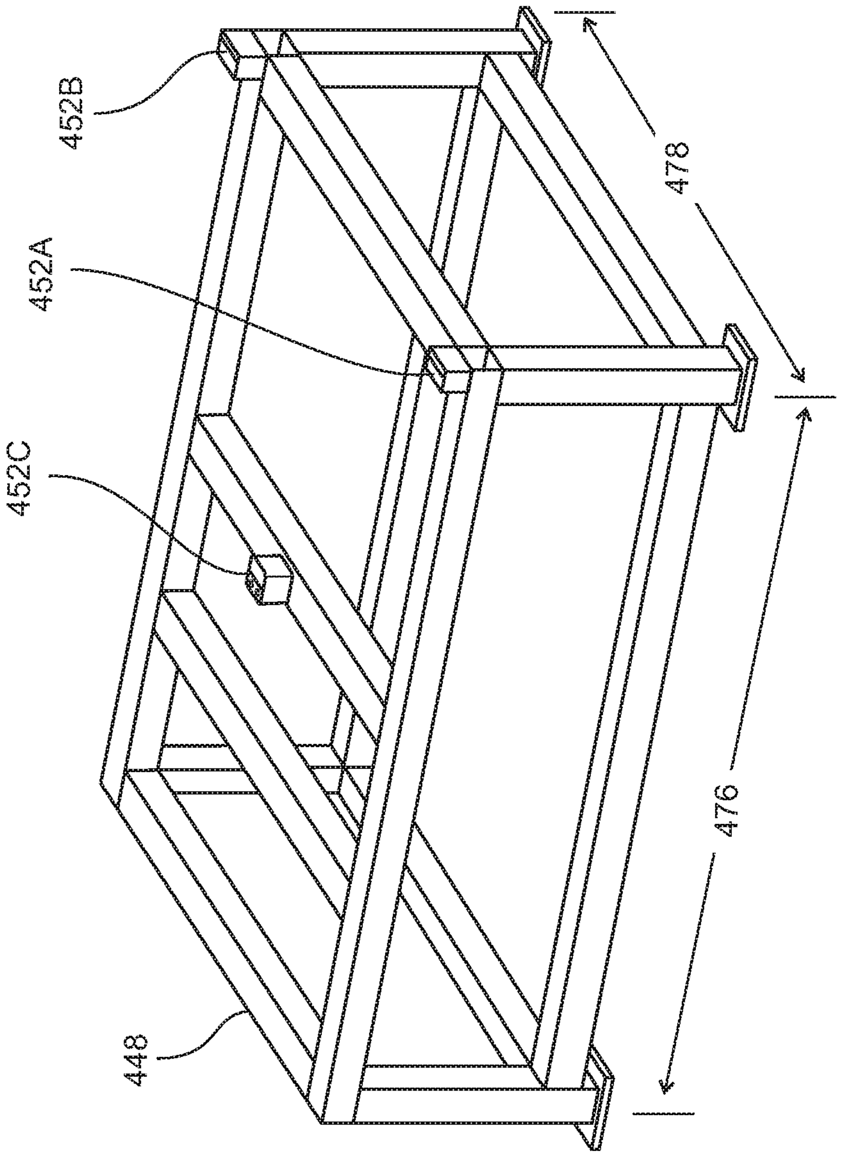
FIG. 4A is a perspective view of an example of a frame on which a vacuum chamber may be supported according to some embodiments.

FIGS. 4A to 5B illustrate one non-limiting example of an arrangement for the mounting members. FIGS. 4A and 4B are a perspective view and top plan view, respectively, of an example of a frame 448 for supporting a vacuum chamber. The frame 448 may correspond to the base 148 described above and illustrated in FIGS. 1A and 1B. The frame 448 may have a three-dimensional open structure that provides space below the vacuum chamber. Depending on the embodiment, vacuum equipment, electrical wiring, etc. may be provided in the space enveloped by the frame 448, as appreciated by persons skilled in the art. The frame 448 has a frame length (or first side) 476, a frame width (or second side) 478, and a height between a bottom side and top side. In the present example, a first outside mounting member 452A, a second outside mounting member 452B, and a third outside mounting member 452C are attached to the top of the frame 448. The first outside mounting member 452A and the second outside mounting member 452B are spaced from each other along the frame width 478, and are at the same position along the frame length 476. In the specific example, the first outside mounting member 452A and second outside mounting member 452B are located at respective corners of the frame 448 that share a common side (along the frame width 478). The third outside mounting member 452C is spaced from the first outside mounting member 452A and the second outside mounting member 452B along the frame length 476, and is positioned at an intermediate point between the first outside mounting member 452A and the second outside mounting member 452B along the frame width 478. In other embodiments, more than three outside mounting members may be coupled between the frame 448 and the vacuum chamber.

Figure 4B:
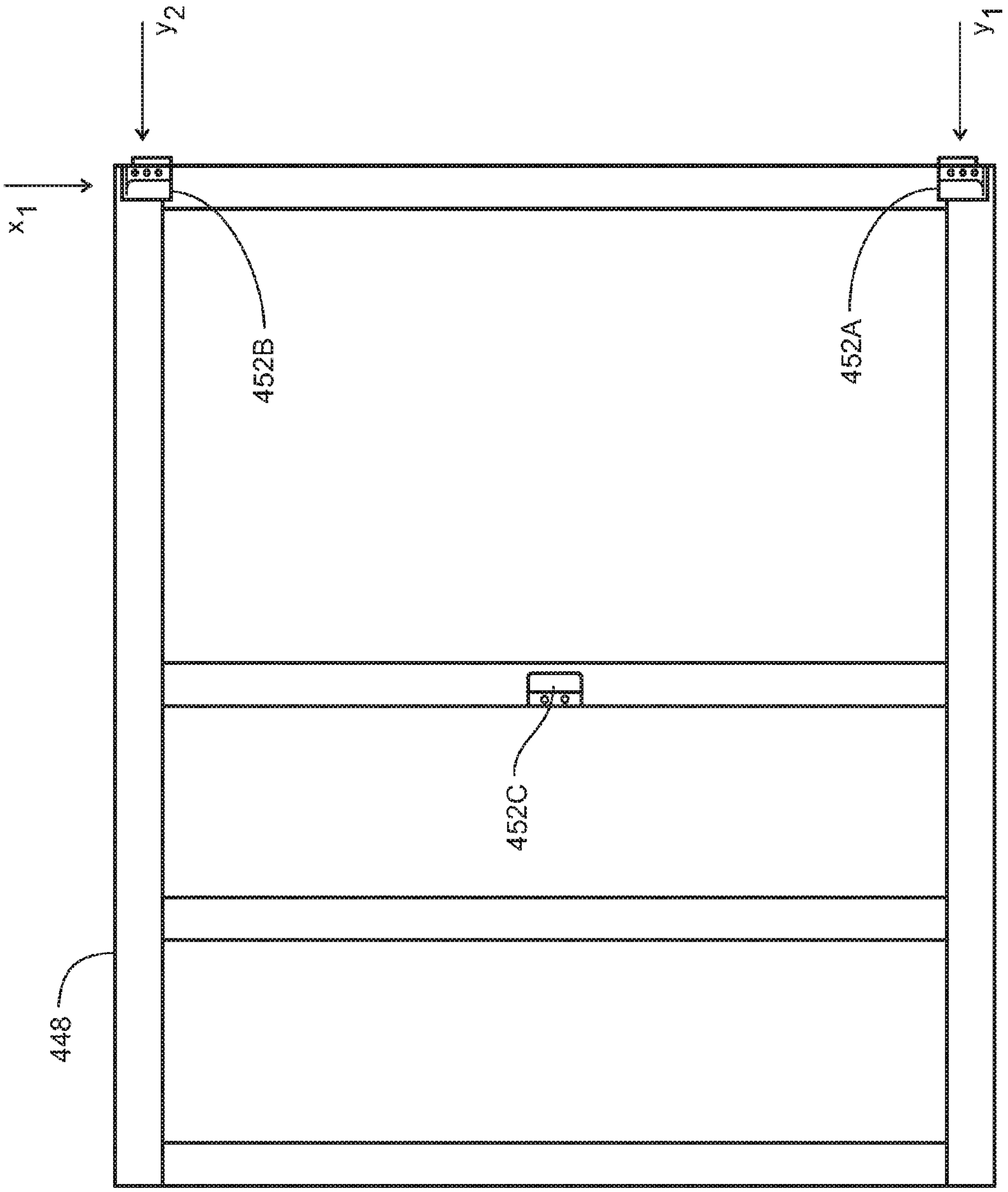
FIG. 4B is a top plan view of the frame illustrated in FIG. 4A.

In some embodiments, the outside mounting members 452A, 452B, and 452C may be configured to provide a properly constrained kinematic system for supporting the vacuum chamber, similar to the manner in which the inside mounting members may support the optics plate. For example, as illustrated in FIG. 4B, the outside mounting members 452A, 452B, and 452C each include a horizontally oriented, small-area plate (optionally with holes for receiving bolts, or other fastening components) to constrain the vacuum chamber along the z-axis ($z_1$, $z_2$ and $z_3$). The first outside mounting member 452A also includes a small plate oriented to constrain the vacuum chamber along the y-axis ($y_1$). In addition, the second outside mounting member 452B includes small plates oriented to constrain the vacuum chamber along the x-axis ($x_1$) and the y-axis ($y_2$), respectively. The z-axis constraints prevent rotation about the x-axis and y-axis, and the y-axis constraints prevent rotation about the z-axis. In this example, the outside mounting members 452A, 452B, and 452C are configured to provide a total of six constraints ($x_1+y_1+y_2+z_1+z_2+z_3$), and therefore provide a properly constrained kinematic system.

Figure 5A:
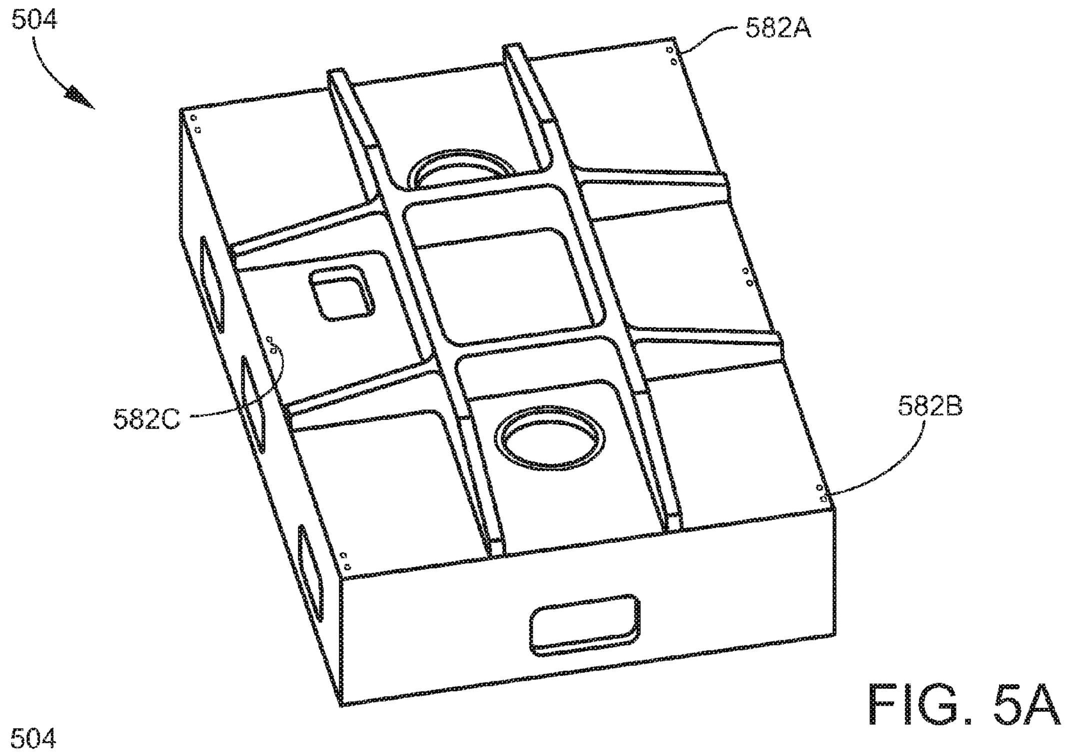
FIG. 5A is a bottom perspective view of an example of a vacuum chamber according to some embodiments.
Figure 5B:
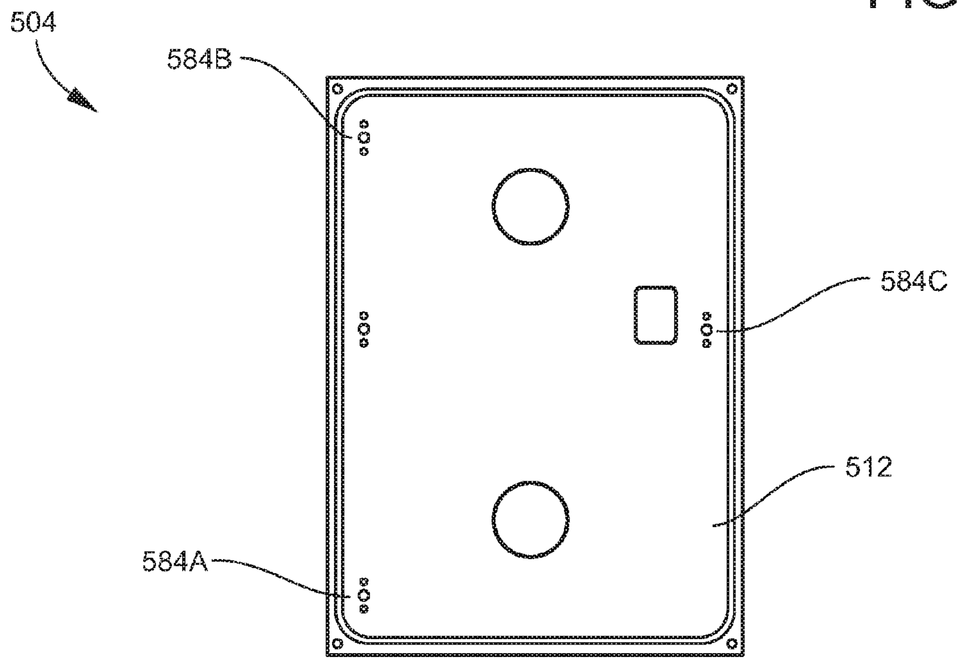
FIG. 5B is a top plan view of the vacuum chamber illustrated in FIG. 5A with an upper chamber wall (e.g., lid) thereof removed.

FIG. 5A is a bottom perspective view of an example of a vacuum chamber 504 according to some embodiments. The bottom side of the vacuum chamber 504 includes outside mounting features 582A, 582B, and 582C corresponding to mounting locations at which respective outside mounting members 452A, 452B, and 452C (FIGS. 4A and 4B) are to be attached. FIG. 5A also shows that the vacuum chamber 504 may include reinforcing members, as well as apertures for providing various sealed interfaces, as described above. FIG. 5B is a top plan view of the vacuum chamber 504 with an upper chamber wall (e.g., lid) thereof removed. A bottom inside surface 512 of the vacuum chamber 504 includes inside mounting features 584A, 584B, and 584C corresponding to mounting locations at which respective inside mounting members are to be attached (e.g., inside mounting members such as shown in FIGS. 1A to 3B). In some embodiments, the inside mounting features 584A, 584B, and 584C (and thus the inside mounting members) may be located directly across the chamber wall from (or proximate to the positions directly across the chamber wall from) the outside mounting features 582A, 582B, and 582C (and thus the outside mounting members 452A, 452B, and 452C), as described above.

Referring to FIG. 1, in addition to isolating the ion optics 116 mounted to the optics plate 136 from deformations, the optics plate 136 may also provide a significant advantage at the time of assembly. The optics plate 136 enables all of the components of the ion optics 116 to be assembled, aligned, and measured outside the vacuum chamber 104 (or 504 in FIGS. 5A and 5B), i.e., before transferring the ion optics 116 into the vacuum chamber 104 or 504. The optics plate 136 may first be supported in a similar fashion as when it is mounted inside the vacuum chamber 104 or 504. Referring to FIG. 5B, for example, the optics plate 136 and inside mounting members 140 (or 240 in FIGS. 2A and 2B, or 340 in FIG. 3A or 3B) may be mounted to a platform (e.g., an assembly stage) that provides the same mounting features, and at the same locations, as the inside mounting features 584A, 584B, and 584C of the vacuum chamber 504. This allows for the use of metrology instrumentation that otherwise would not be possible to use inside the vacuum chamber 504. Once the ensemble of optics components is properly mounted, aligned, and measured, the optics plate 136 with the assembled ion optics 116 properly mounted thereon may then be transferred into the vacuum chamber 504 without expecting any dimensional changes on the alignment, due to the assembly being properly kinematically constrained.

Figure 6:
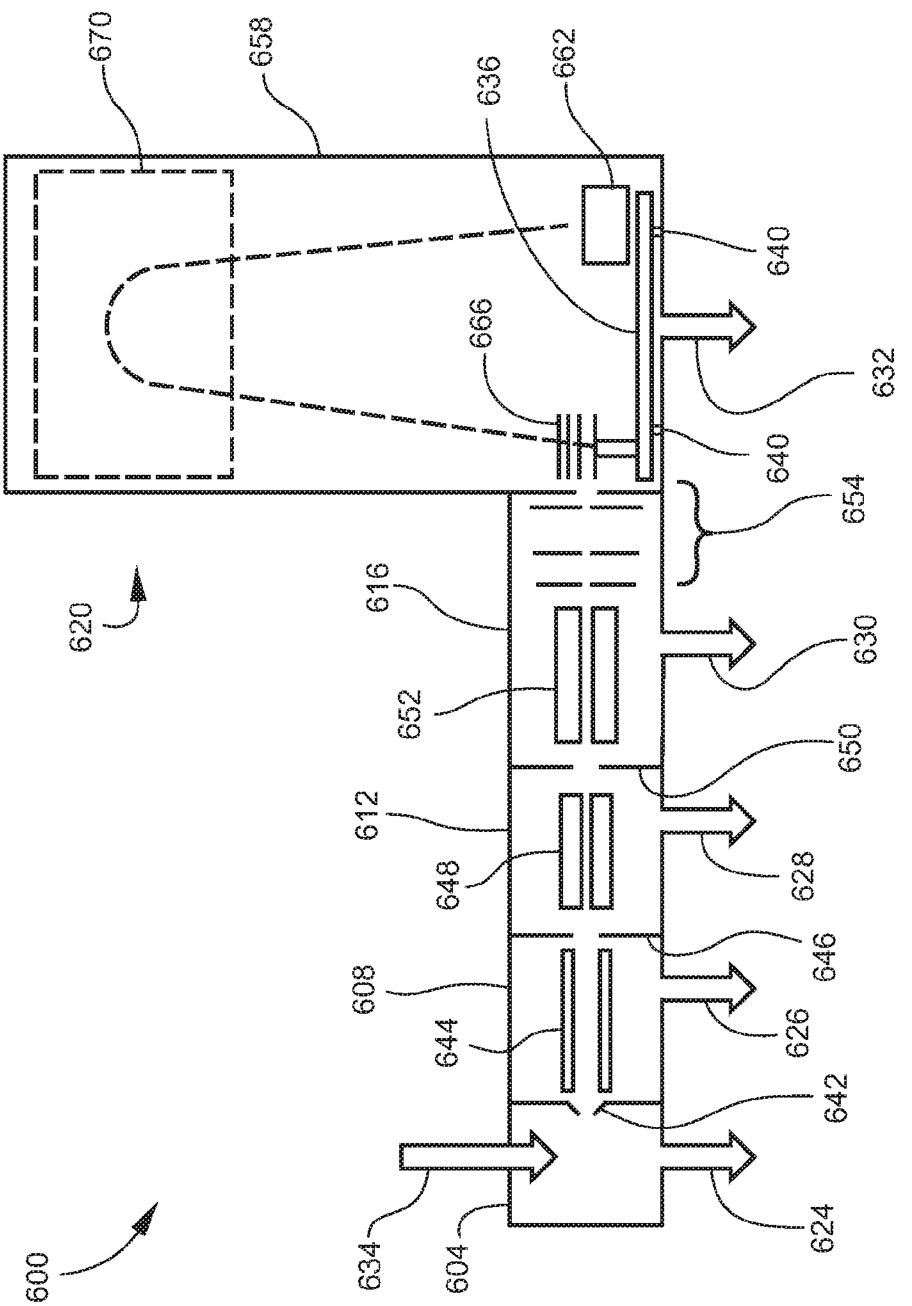
FIG. 6 is a schematic view of an example of a mass spectrometry (MS) system according to some embodiments.

FIG. 6 illustrates an example of an operating environment for an ion processing apparatus 100 and associated components and features such as described above and illustrated in FIGS. 1A to 4B. Specifically, FIG. 6 is a schematic view of an example of a mass spectrometry (MS) system 600 according to some embodiments. The operation and design of various components of MS systems are generally known to persons skilled in the art and thus need not be described in detail herein. Instead, certain components are briefly described to facilitate an understanding of the subject matter presently disclosed.

The MS system 600 may generally include a plurality of ion processing apparatuses, such as an ion source 604, one or more ion transfer devices 608, 612, and 616 (or ion processing devices), and a mass spectrometer (MS) 620. Three ion transfer devices 608, 612, and 616 are illustrated by example only, as other embodiments may include more than three, less than three, or none. The MS system 600 includes a plurality of chambers arranged in series such that each chamber communicates with at least one adjacent (upstream or downstream) chamber. Each of the ion source 604, ion transfer devices 608, 612, and 616, and MS 620 includes at least one of these chambers. Thus, the MS system 600 defines a flow path for ions and gas molecules generally from the chamber of the ion source 604, through the chambers of the ion transfer devices 608, 612, and 616, and into the chamber of the MS 620. From the perspective of FIG. 6, the flow path is generally directed from the left to the right. Each chamber is physically separated from an adjacent chamber by at least one structural boundary, e.g., a wall. The wall includes at least one opening to accommodate the flow path. The wall opening may be quite small relative to the overall dimensions of the chambers, thus serving as a gas conductance barrier that limits transfer of gas from a preceding chamber to a succeeding chamber and facilitates independent control of respective vacuum levels in adjacent chambers. The wall may serve as an electrode or ion optics component. Alternatively or additionally, electrodes and/or ion optics components may be mounted to or positioned proximate to the wall. Any of the chambers may include one or more ion optics.

At least some of the chambers may be configured as vacuum chambers, and thus may be configured the same as or similar to the vacuum chambers 104 and 504 described above and illustrated in FIGS. 1A, 1B, 5A and 5B. For this purpose the MS system 600 includes a vacuum system communicating with vacuum ports of such chambers. In the illustrated embodiment, each of the ion source 604, ion transfer devices 608, 612, and 616, and MS 620 includes at least one chamber having a respective vacuum port 624, 626, 628, 630, and 632 that communicates with the vacuum system. In operation, each chamber successively reduces the gas pressure below the level of the preceding chamber, ultimately down to the very high vacuum level (very low vacuum-level gas pressure) required for operating the MS 620 in the analytical mode (e.g., ranging from $10^{-4}$ to $10^{-9}$ Torr). In FIG. 6, the vacuum ports 624, 626, 628, 630, and 632 are schematically represented by wide arrows. The vacuum system as a whole is schematically represented by these wide arrows, with the understanding that the vacuum system includes vacuum lines leading from the vacuum ports 624, 626, 628, 630, and 632 to one or more vacuum-generating pumps and associated plumbing and other components as appreciated by persons skilled in the art.

The ion source 604 may be any type of continuous-beam or pulsed ion source suitable for producing analyte ions for mass spectral analysis. The ion source 604 includes an ionization chamber in which sample molecules are broken down to analyte ions by an ionization device (not shown). Depending on the embodiment, the ion source 604 may operate at a vacuum level or at atmospheric pressure. The sample to be ionized may be introduced to the ion source 604 by any suitable means, including hyphenated techniques in which the sample is an output 634 of an analytical separation instrument such as, for example, a gas chromatography (GC) or liquid chromatography (LC) instrument (not shown). The ion source 604 may include a skimmer 642 configured for preferentially allowing ions to pass through to the next chamber while blocking non-analyte components. The skimmer 642 may in some embodiments be operated as an electrode. The ion source 604 may also include other ion optics (not shown) useful for organizing as-produced ions into a beam that may be efficiently transferred into the next chamber.

The ion transfer devices 608, 612, and 616 may also include ion optics, as will now be described by non-limiting examples of embodiments. In some embodiments, the ion transfer device 608 may be configured primarily as a pressure-reducing stage. For this purpose, the ion transfer device 608 may include ion transfer optics 644 configured for keeping the ion beam focused along a main optical axis of the MS system 600. The ion transfer optics 644 may have various configurations known to persons skilled in the art, such as, for example, a multipole arrangement of electrodes elongated along the axis, a serial arrangement of ring electrodes, an ion funnel, a split cylinder electrode, etc. In some embodiments, the ion transfer optics 644 may be configured as an ion trap. One or more lenses 646 may be positioned between the ion transfer device 608 and the adjacent ion transfer device 612.

In some embodiments, the ion transfer device 612 may be configured as a mass filter or an ion trap configured for selecting ions of a specific m/z ratio or m/z ratio range. For this purpose, the ion transfer device 608 may include ion transfer optics 648 such as a multipole arrangement of electrodes. One or more lenses 650 may be positioned between the ion transfer device 612 and the adjacent ion transfer device 616. In other embodiments, the ion transfer device 612 may be configured primarily as a pressure-reducing stage.

In some embodiments, the ion transfer device 616 may be configured as a cooling cell. For this purpose, the ion transfer device 616 may include ion transfer optics 652 such as a multipole arrangement of electrodes, configured as a non-mass-resolving, RF-only device. A cooling gas (or damping gas) such as, for example, argon, nitrogen, helium, etc., may be flowed into the chamber of the ion transfer device 616 to cool down (or "thermalize," i.e., reduce the kinetic energy of) the ions during operation in the analytical mode by way of collisions between the ions and the gas molecules. In other embodiments, the ion transfer device 616 may be configured as an ion fragmentation device such as a collision cell. In one example, ion fragmentation is accomplished by way of collision induced dissociation (CID), in which case the gas added to the chamber (the "collision gas") results in a gas pressure sufficient to enable fragmentation by CID. Ion beam shaping optics 654 may be positioned between the ion transfer device 616 and the MS 620. In other embodiments, the ion transfer device 616 may be configured primarily as a pressure-reducing stage.

The MS 620 may be any type of MS. The MS 620 generally includes a mass analyzer 658 and an ion detector 662. In the illustrated embodiment, by example only, the MS 620 is a time-of-flight mass spectrometer (TOFMS). In this case, the mass analyzer 658 includes an electric field-free flight tube into which ions are injected by an ion pusher 666 (or ion pulser, or ion extractor). As appreciated by persons skilled in the art, the beam shaping optics 654 direct the ion beam into the ion pusher 666, which pulses the ions into the flight tube as ion packets. The ions drift through the flight tube toward the ion detector 662. Ions of different masses travel through the flight tube at different velocities and thus have different overall times-of-flight, i.e., ions of smaller masses travel faster than ions of larger masses. Each ion packet spreads out (is dispersed) in space in accordance with the time-of-flight distribution. The ion detector 662 detects and records the time that each ion arrives at (impacts) the ion detector 662. A data acquisition module correlates the recorded times-of-flight with m/z ratios. The ion detector 662 may be any device configured for collecting and measuring the flux (or current) of mass-discriminated ions outputted from the mass analyzer 658. Examples of ion detectors include, but are not limited to, multi-channel plates, electron multipliers, photomultipliers, and Faraday cups. In some embodiments, as illustrated, the ion pusher 666 accelerates the ion packets into the flight tube in a direction orthogonal to the direction along which the beam shaping optics 654 transmit the ions into the ion pusher 666, which is known as orthogonal acceleration TOF (oa-TOF). In this case, the flight tube often includes an ion mirror (or reflectron) 670 to provide a 180° reflection or turn in the ion flight path (depicted as a dashed line) for extending the flight path and correcting the kinetic energy distribution of the ions. In other embodiments, the MS 620 may include another type of mass analyzer such as, for example, a mass filter, an ion trap, an ion cyclotron resonance (ICR) cell, an electrostatic ion trap, or a static electric and/or magnetic sector analyzer.

In operation, a sample is introduced to the ion source 604. The ion source 604 produces analyte ions from the sample and transfers the ions to one or more ion transfer devices 608, 612, and 616. The ion transfer device(s) 608, 612, and 616 transfer the ions through one or more pressure-reducing stages and into the MS 620. Depending on what type or types of ion transfer devices 608, 612, and 616 are included, the ion transfer device(s) 608, 612, and 616 may perform additional ion processing operations such as mass filtering, ion fragmentation, beam shaping, etc., as described above. The MS 620 mass-resolves the ions as described above. The measurement signals outputted from the ion detector 662 are processed by electronics of the MS system 600 to produce mass spectra.

As a general matter, vacuum chamber deformation may be a concern in any of the ion processing apparatuses of the MS system 600 described above that include ion optics mounted in a vacuum chamber. Hence, one or more of the ion source 604, ion transfer devices 608, 612, and 616, and MS 620 may be configured as the ion processing apparatus 100 described above and illustrated in FIGS. 1A to 5B, and thus may include an optics plate 136 and inside mounting members 140, 240 or 340 in a vacuum chamber 104 or 404, and may further include outside mounting members 152 or 452A, 452B, and 452C. Vacuum chamber deformation may in particular be a concern, for example, in relatively large vacuum chambers where the area exposed to the applied force resulting from the pressure differential is large relative to the wall thickness. One example is the MS 620. The ion pusher 666 must be precisely aligned with the beam shaping optics 654, and the ion pusher 666 and the ion detector 662 must both be precisely aligned with the ion mirror 670. Moreover, the ion pusher 666 and the ion detector 662 must both be positioned at precise angles from the ion mirror 670 and from each other. Thus, in some embodiments the ion pusher 666 and the ion detector 662 may be mounted to an optics plate 636, and the optics plate 636 may be supported on the bottom inside surface of the chamber of the mass analyzer 658 by a plurality of inside mounting members 640. The chamber of the mass analyzer 658 may in turn be supported on an underlying base or frame by outside mounting members (not shown). Moreover, as described earlier in this disclosure, the ion pusher 666 and ion detector 662 may first be assembled on the optics plate 636, aligned, and measured outside the MS 620, and thereafter transferred into the MS 620 in the proper state of alignment and positioning.

Exemplary Embodiments

Exemplary embodiments provided in accordance with the presently disclosed subject matter include, but are not limited to, the following:

1. A charged particle processing apparatus, comprising: a vacuum chamber comprising a chamber wall; an optics plate; charged particle optics mounted to the optics plate; and a plurality of mounting members coupled between the optics plate and the chamber wall, wherein the mounting members are configured for cooperatively constraining six degrees of freedom of the optics plate, and at least one of the mounting members is movable or flexible in at least one direction in response to deformation of the chamber wall.

2. The charged particle processing apparatus of embodiment 1, wherein the chamber wall comprises a plurality of inside surfaces, and the mounting members are each coupled to the same inside surface.

3. The charged particle processing apparatus of embodiment 1, wherein the chamber wall comprises a plurality of inside surfaces, and at least two of the mounting members are coupled to different inside surfaces.

4. The charged particle processing apparatus of any of the preceding embodiments, wherein the plurality of mounting members comprises at least three mounting members.

5. The charged particle processing apparatus of any of the preceding embodiments, wherein the plurality of mounting members ranges from three to six mounting members.

6. The charged particle processing apparatus of any of the preceding embodiments, wherein the at least one mounting member is translatable in the at least one direction.

7. The charged particle processing apparatus of any of the preceding embodiments, wherein the at least one mounting member is rotatable about an axis.

8. The charged particle processing apparatus of any of the preceding embodiments, wherein: the at least one mounting member comprises a height along a z-axis, and a transverse cross-section orthogonal to the z-axis and defined by a first transverse direction and a second transverse direction orthogonal to the first transverse direction; and the at least one mounting member is rigid in the z-direction, rigid in the first transverse direction, and further has a configuration selected from the group consisting of: the at least one mounting member is movable or flexible in the second transverse direction; the at least one mounting member is bendable about the first transverse direction; and both of the foregoing.

9. The charged particle processing apparatus of any of the preceding embodiments, wherein the at least one mounting member comprises a hinge or a flexure hinge.

10. The charged particle processing apparatus of any of the preceding embodiments, wherein the at least one mounting member comprises: a height along a z-axis; a transverse cross-section orthogonal to the z-axis and defined by a first transverse direction and a second transverse direction orthogonal to the first transverse direction; a pair of channels extending along the first transverse direction; and a lateral side extending along the second transverse direction, and comprising a region of reduced cross-sectional area between the channels.

11. The charged particle processing apparatus of any of embodiments 1 to 8, wherein the at least one mounting member comprises a dual hinge or a dual flexure hinge.

12. The charged particle processing apparatus of any of embodiments 1 to 8 or 11, wherein the at least one mounting member comprises: a height along a z-axis; a transverse cross-section orthogonal to the z-axis and defined by a first transverse direction and a second transverse direction orthogonal to the first transverse direction; a pair of first channels extending along the first transverse direction; a pair of second channels extending along the first transverse direction and spaced from the first channels along the z-axis; and a lateral side extending along the second transverse direction, and comprising a first region of reduced cross-sectional area between the first channels, and a second region of reduced cross-sectional area between the second channels.

13. The charged particle processing apparatus of any of the preceding embodiments, wherein the at least one mounting member is a first mounting member movable or flexible in at least a first direction in response to deformation of the chamber wall, and the plurality of mounting members comprises a second mounting member movable or flexible in at least a second direction in response to deformation of the chamber wall, and the second direction is different from the first direction.

14. The charged particle processing apparatus of any of the preceding embodiments, wherein the optics plate comprises a first side and an opposing second side, and the plurality of mounting members comprises first mounting member coupled to the optics plate proximate to the first side, a second mounting member coupled to the optics plate proximate to the second side, and a third mounting member coupled to the optics plate proximate to the second side and spaced at a distance from the second mounting member.

15. The charged particle processing apparatus of embodiment 14, wherein the optics plate is polygonal.

16. The charged particle processing apparatus of any of the preceding embodiments, wherein the mounting members coupled between the optics plate and the chamber wall are inside mounting members, and further comprising a plurality of outside mounting members coupled to the vacuum chamber.

17. The charged particle processing apparatus of embodiment 16, wherein the outside mounting members are coupled to a side of the chamber wall opposite to the inside mounting members.

18. The charged particle processing apparatus of embodiment 17, wherein the outside mounting members are located at positions directly across the chamber wall from, or proximate to positions directly across the chamber wall from, the respective inside mounting members.

19. The charged particle processing apparatus of any of embodiments 16 to 18, wherein the outside mounting members are configured for cooperatively constraining six degrees of freedom of the vacuum chamber.

20. The charged particle processing apparatus of any of the preceding embodiments, wherein the charged particle optics are selected from the group consisting of: electron optics, ion optics, electrodes, lenses, ion deflectors, ion gates, ion guides, ion funnels, ion beam shapers, ion slicers, ion beam concentrators, ion pushers, ion mirrors, ion detectors, and a combination of two or more of the foregoing.

21. A mass spectrometry (MS) system, comprising: an ion source; a mass analyzer; and a charged particle processing apparatus according to any of the preceding embodiments, wherein the MS system defines an ion path from the ion source to the mass analyzer, and the ion path passes through the vacuum chamber.

22. The MS system of embodiment 21, wherein the charged particle processing apparatus is located at a position selected from the group consisting of: at the ion source; between the ion source and the mass analyzer; and at the mass analyzer.

23. A method for assembling a charged particle processing apparatus, the method comprising: mounting an optics plate to a platform by coupling a plurality of mounting members between the optics plate and the platform, wherein the platform is external to a vacuum chamber of the charged particle processing apparatus; assembling charged particle optics on the optics plate; aligning the charged particle optics; decoupling the mounting members from the platform; transferring the optics plate from the platform to the vacuum chamber; and mounting the optics plate to a chamber wall of the vacuum chamber by coupling the mounting members to the chamber wall.

24. The method of embodiment 23, wherein mounting the optics plate to the chamber wall comprises coupling the mounting members to the chamber wall in substantially the same spatial arrangement as the mounting members were coupled to the platform.

25. The method of embodiment 23 or 24, wherein the mounting members are configured for cooperatively constraining six degrees of freedom of the optics plate.

26. The method of any of embodiments 23 to 25, wherein at least one of the mounting members is movable or flexible in at least one direction in response to deformation of the chamber wall.

While certain embodiments have been described herein primarily in the context of MS instrumentation, it will be understood that subject matter disclosed herein may be applied to any other type of apparatus that includes charged particle optics (e.g., ion optics, electron optics, etc.) mounted in a vacuum chamber. Examples of other types of apparatus include other types of analytical instruments, including other types of spectrometers such as, for example ion mobility spectrometers configured for operation under vacuum, and various types of inspection instruments such as, for example, electron microscopes.

It will be understood that terms such as “communicate” and “in . . . communication with” (for example, a first component “communicates with” or “is in communication with” a second component) are used herein to indicate a structural, functional, mechanical, electrical, signal, optical, magnetic, electromagnetic, ionic or fluidic relationship between two or more components or elements. As such, the fact that one component is said to communicate with a second component is not intended to exclude the possibility that additional components may be present between, and/or operatively associated or engaged with, the first and second components.

It will be understood that various aspects or details of the invention may be changed without departing from the scope of the invention. Furthermore, the foregoing description is for the purpose of illustration only, and not for the purpose of limitation—the invention being defined by the claims.

What is claimed is:

1. A charged particle processing apparatus, comprising:
- a vacuum chamber comprising a chamber wall;
- an optics plate;
- charged particle optics mounted to the optics plate; and
- a plurality of mounting members coupled between the optics plate and the chamber wall, wherein the mounting members are configured for cooperatively constraining six degrees of freedom of the optics plate, and at least one of the mounting members is movable or flexible in at least one direction in response to deformation of the chamber wall.

2. The charged particle processing apparatus of claim 1, wherein the chamber wall comprises a plurality of inside surfaces, and the mounting members have a configuration selected from the group consisting of: the mounting members are each coupled to the same inside surface; and at least two of the mounting members are coupled to different inside surfaces.

3. The charged particle processing apparatus of claim 1, wherein the plurality of mounting members comprises at least three mounting members, or the plurality of mounting members ranges from three to six mounting members.

4. The charged particle processing apparatus of claim 1, wherein the at least one mounting member is translatable in the at least one direction, or the at least one mounting member is rotatable about an axis.

5. The charged particle processing apparatus of claim 1, wherein:
- the at least one mounting member comprises a height along a z-axis, and a transverse cross-section orthogonal to the z-axis and defined by a first transverse direction and a second transverse direction orthogonal to the first transverse direction; and
- the at least one mounting member is rigid in the z-direction, rigid in the first transverse direction, and further has a configuration selected from the group consisting of:
  - the at least one mounting member is movable or flexible in the second transverse direction;
  - the at least one mounting member is bendable about the first transverse direction; and
  - both of the foregoing.

6. The charged particle processing apparatus of claim 1, wherein the at least one mounting member comprises:
- a height along a z-axis;
- a transverse cross-section orthogonal to the z-axis and defined by a first transverse direction and a second transverse direction orthogonal to the first transverse direction;
- a pair of channels extending along the first transverse direction; and
- a lateral side extending along the second transverse direction, and comprising a region of reduced cross-sectional area between the channels.

7. The charged particle processing apparatus of claim 1, wherein the at least one mounting member comprises a hinge, a flexure hinge, a dual hinge, or a dual flexure hinge.

8. The charged particle processing apparatus of claim 1, wherein the at least one mounting member comprises:
- a height along a z-axis;
- a transverse cross-section orthogonal to the z-axis and defined by a first transverse direction and a second transverse direction orthogonal to the first transverse direction;
- a pair of first channels extending along the first transverse direction;
- a pair of second channels extending along the first transverse direction and spaced from the first channels along the z-axis; and
- a lateral side extending along the second transverse direction, and comprising a first region of reduced cross-sectional area between the first channels, and a second region of reduced cross-sectional area between the second channels.

9. The charged particle processing apparatus of claim 1, wherein the at least one mounting member is a first mounting member movable or flexible in at least a first direction in response to deformation of the chamber wall, and the plurality of mounting members comprises a second mounting member movable or flexible in at least a second direction in response to deformation of the chamber wall, and the second direction is different from the first direction.

10. The charged particle processing apparatus of claim 1, wherein the optics plate comprises a first side and an opposing second side, and the plurality of mounting members comprises first mounting member coupled to the optics plate proximate to the first side, a second mounting member coupled to the optics plate proximate to the second side, and a third mounting member coupled to the optics plate proximate to the second side and spaced at a distance from the second mounting member.

11. The charged particle processing apparatus of claim 1, wherein the mounting members coupled between the optics plate and the chamber wall are inside mounting members, and further comprising a plurality of outside mounting members coupled to the vacuum chamber.

12. The charged particle processing apparatus of claim 11, wherein the outside mounting members are coupled to a side of the chamber wall opposite to the inside mounting members.

13. The charged particle processing apparatus of claim 12, wherein the outside mounting members are located at positions directly across the chamber wall from, or proximate to positions directly across the chamber wall from, the respective inside mounting members.

14. The charged particle processing apparatus of claim 11, wherein the outside mounting members are configured for cooperatively constraining six degrees of freedom of the vacuum chamber.

15. The charged particle processing apparatus of claim 1, wherein the charged particle optics are selected from the group consisting of: electron optics, ion optics, electrodes, lenses, ion deflectors, ion gates, ion guides, ion funnels, ion beam shapers, ion slicers, ion beam concentrators, ion pushers, ion mirrors, ion detectors, and a combination of two or more of the foregoing.

16. A mass spectrometry (MS) system, comprising:

an ion source;

a mass analyzer; and a charged particle processing apparatus according to claim 1, wherein the MS system defines an ion path from the ion source to the mass analyzer, and the ion path passes through the vacuum chamber.

17. The MS system of claim 16, wherein the charged particle processing apparatus is located at a position selected from the group consisting of: at the ion source; between the ion source and the mass analyzer; and at the mass analyzer.

18. A method for assembling a charged particle processing apparatus, the method comprising:

mounting an optics plate to a platform by coupling a plurality of mounting members between the optics plate and the platform, wherein the platform is external to a vacuum chamber of the charged particle processing apparatus;

assembling charged particle optics on the optics plate;

aligning the charged particle optics;

decoupling the mounting members from the platform;

transferring the optics plate from the platform to the vacuum chamber; without causing changes to the alignment and mounting the optics plate to a chamber wall of the vacuum chamber by coupling the mounting members to the chamber wall.

19. The method of claim 18, wherein mounting the optics plate to the chamber wall comprises coupling the mounting members to the chamber wall in substantially the same spatial arrangement as the mounting members were coupled to the platform.

20. The method of claim 18, wherein the mounting members have a configuration selected from the group consisting of: the mounting members are configured for cooperatively constraining six degrees of freedom of the optics plate; at least one of the mounting members is movable or flexible in at least one direction in response to deformation of the chamber wall; and both of the foregoing.

* * * * *